United States Patent [19]

Ishida et al.

[11] Patent Number: 5,828,958
[45] Date of Patent: Oct. 27, 1998

[54] MOBILE COMMUNICATIONS SYSTEM AND COMMUNICATIONS NETWORK

[75] Inventors: So Ishida, Tama; Hiroshi Nakamura, Tokyo; Yasuyuki Uchiyama, Choufu, all of Japan

[73] Assignee: NTT Mobile Communications Network, Inc., Japan

[21] Appl. No.: 716,182

[22] PCT Filed: Feb. 6, 1996

[86] PCT No.: PCT/JP96/00241

§ 371 Date: Sep. 27, 1996

§ 102(e) Date: Sep. 27, 1996

[87] PCT Pub. No.: WO96/25014

PCT Pub. Date: Aug. 15, 1996

[30] Foreign Application Priority Data

Feb. 7, 1995 [JP] Japan ............................... 7/19419

[51] Int. Cl.⁶ .................................................. H04B 7/24
[52] U.S. Cl. ............................................ 455/433; 455/435
[58] Field of Search ..................................... 455/433, 432, 455/435

[56] References Cited

U.S. PATENT DOCUMENTS

| | | | |
|---|---|---|---|
| 5,519,706 | 5/1996 | Bantz et al. | 455/435 |
| 5,577,264 | 11/1996 | Tuohino | 455/432 |
| 5,649,301 | 7/1997 | Yabusaki et al. | 455/433 |
| 5,659,544 | 8/1997 | La Porta et al. | 455/433 |

FOREIGN PATENT DOCUMENTS

| | | |
|---|---|---|
| 6-070365 | 3/1994 | Japan . |
| 6-133357 | 5/1994 | Japan . |
| 6-511613 | 12/1994 | Japan . |
| 4-347995 | 12/1995 | Japan . |

*Primary Examiner*—Amelia Au
*Attorney, Agent, or Firm*—John T. Johnson; Roger & Wells LLP

[57] ABSTRACT

A mobile communications system including a plurality of communications networks, each of which has one location register (a home location register or gate location register) and one or more visitor registers. Each of the visitor registers is located in each one of visiting areas for storing information about a communication terminal. The location register stores the number of the visitor register of the visiting area in which the communication terminal is present, and the information about the communication terminal. When the communication terminal moves between the communications networks, the information about the communication terminal is transferred between the location registers. When the communication terminal moves between the visiting areas in the same communications network, the information about the communication terminal is provided from the location register to the visitor register. When the communication terminal moves within the same visiting area, the information about the communication terminal can be obtained from the visitor register. This makes it possible to reduce the traffic on the common control line between the communications networks and in the communications network.

8 Claims, 13 Drawing Sheets

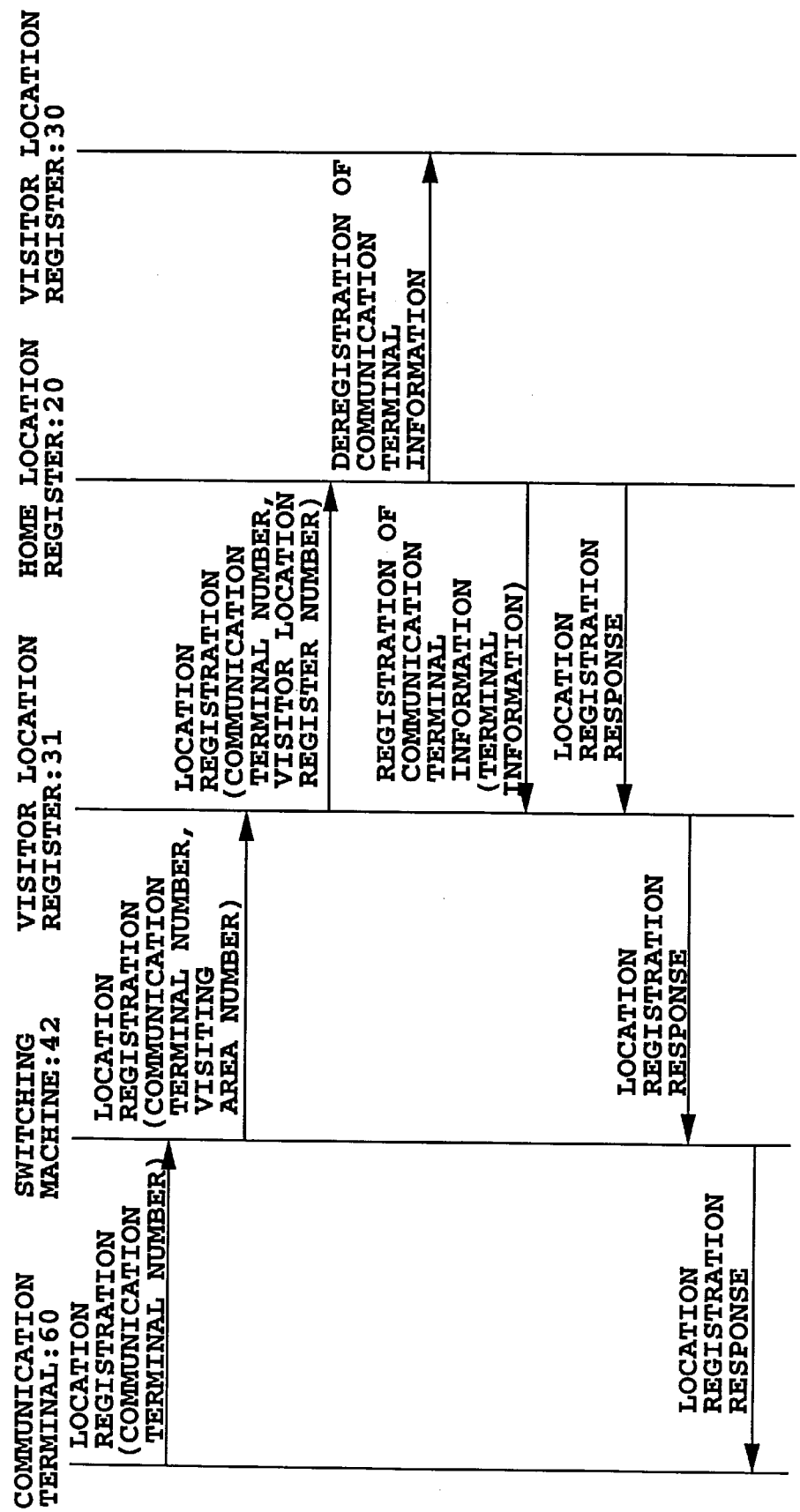
FIG.2A *Prior Art*
LOCATION REGISTRATION (WHILE MOVING IN VISITING AREA)

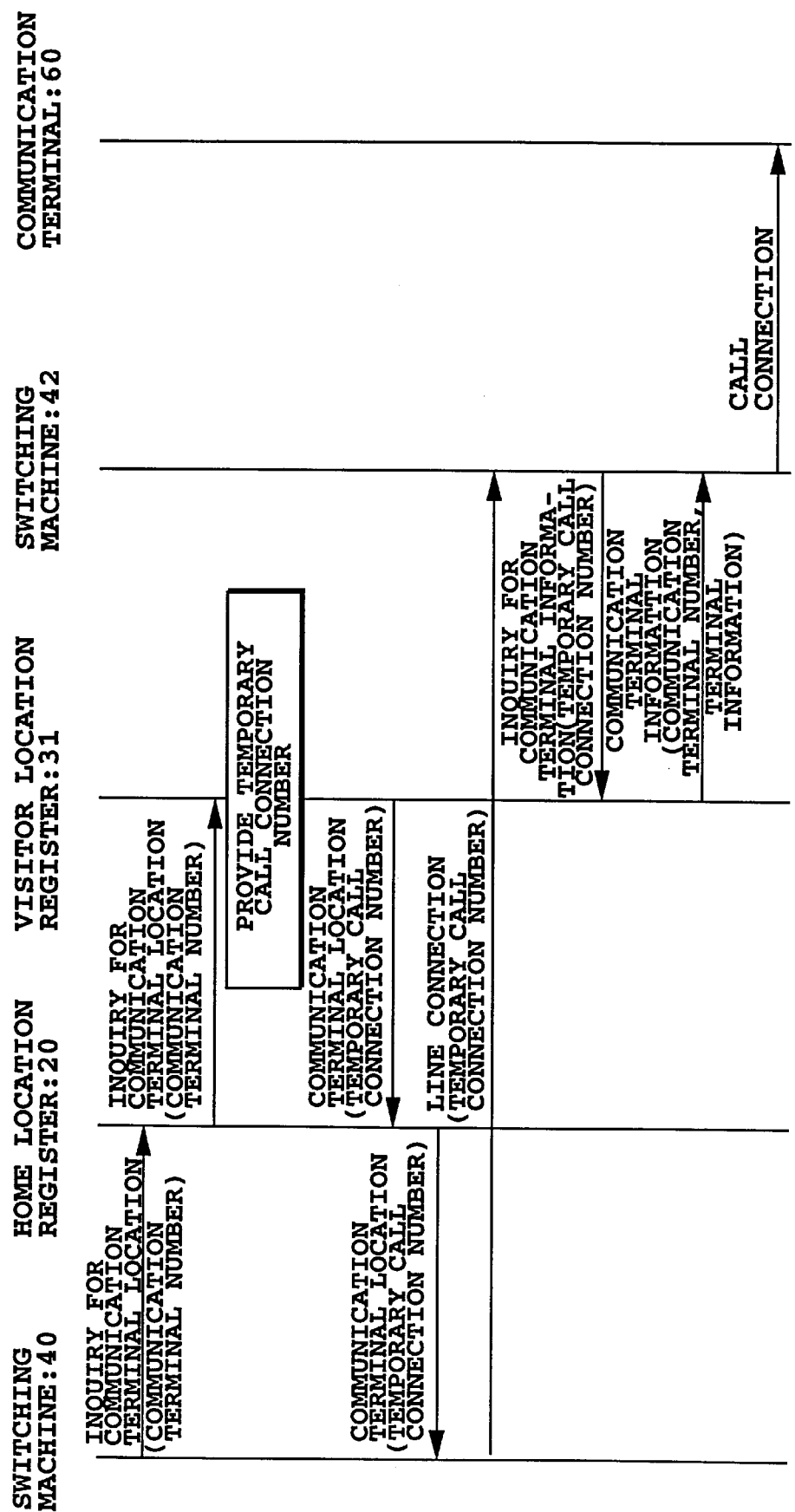
FIG.2B *Prior Art*
CALL CONNECTION PROCESSING

FIRST LOCATION REGISTRATION
(WHILE MOVING FROM VISITING AREA 50 TO 51)

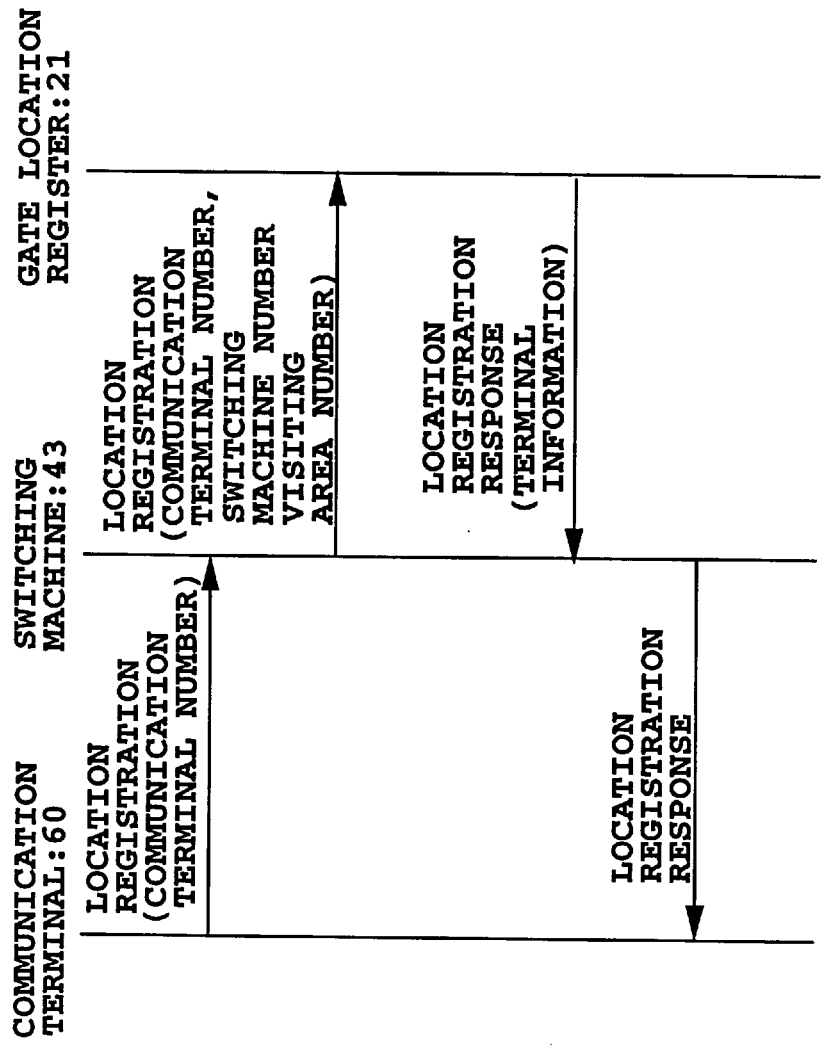
FIG. 4B  *Prior Art*
SECOND AND FOLLOWING LOCATION REGISTRATION (WHILE MOVING IN VISITING AREA 52 OR FROM VISITING AREA 51 TO 52)

FIRST LOCATION REGISTRATION
(WHILE MOVING FROM VISITING AREA 50 TO 51)

SECOND AND FOLLOWING LOCATION REGISTRATION
(WHILE MOVING IN VISITING AREA 51)

SECOND AND FOLLOWING LOCATION REGISTRATION
(WHILE MOVING FROM VISITING AREA 51 TO 52)

5,828,958

MOBILE COMMUNICATIONS SYSTEM AND COMMUNICATIONS NETWORK

TECHNICAL FIELD

The present invention relates to a mobile communications system and a communications network capable of reducing traffic on common control lines in and between networks.

BACKGROUND ART

Two systems are widely known as conventional mobile communications systems: GSM (Global System for Mobile communications) mainly used in Europe; and PDC (Personal Digital Cellular) used in Japan and the U.S.

FIG. 1 shows a GSM system. There are provided a plurality of visiting areas 50, 51 and 52 in networks 10 and 11 offered by common carriers, and communication terminals 60 communicate while moving in the visiting areas. The visiting areas 50, 51 and 52 include visitor location registers 30, 31 and 32, respectively. These registers are connected to the communication terminals 60, which are present in the visiting areas, through switching machines 41, 42 and 43, and manage information about the terminals.

The visitor location registers 30–32 are further connected to a home location register 20 through common control lines. The home location register 20 stores the numbers of the visitor location registers, which indicate areas the communication terminals 60 are visiting, and information about the communication terminal. Each communication terminal is registered in advance in a predetermined home location register.

When the communication terminal 60 is present in the visiting area 50, information about the communication terminal is sent from the home location register 20 to the visitor location register 30 to be stored, and the number of the visitor location register 30 is stored in the home location register 20. When the communication terminal 60 moves from the visiting area 50 in the communications network 10 to the visiting area 51 in the communications network 11, the communication terminal 60 carries out a position registration in the home location register 20 through the switching machine 42.

FIG. 2A illustrates the location registration. When the communication terminal 60 enters the visiting area 51, and sends a location registration signal to the switching machine 42, the visitor location register 31 carries out the location registration of the communication terminal 60. Specifically, the visitor location register 31 sends to the home location register 20 the communication terminal number and visitor location register number associated with the communication terminal 60. The home location register 20 rewrites the visitor location register number from 30 to 31, and requires the visitor location register 30 to delete the information about the communication terminal 60. Besides, it sends the information about the communication terminal 60 to the visitor location register 31. Subsequently, the location registration signal is sent back from the home location register 20 to the communication terminal 60 through the visitor location register 31 and switching machine 42, thus completing the location registration.

When the communication terminal 60 further moves from the visiting area 51 to the visiting area 52 within the same communications network 11, the processing similar to that of FIG. 2A is carried out. That is, a similar processing is performed in which the switching machine 42, visitor location register 31 and visitor location register 30 are replaced by the switching machine 43, visitor location register 32 and visitor location register 31, respectively.

FIG. 2B illustrates the processing procedure of a call connection occurred while the communication terminal 60 is present in the visiting area 51. A call to the communication terminal 60 is connected to the switching machine 40 linked to the home location register 20. The switching machine 40 inquires of the home location register 20 the location of the communication terminal 60. The home location register 20 inquires of the visitor location register 31 the location of the communication terminal 60 using the visitor location register number stored in the home location register 20 as the information about the communication terminal 60. The visitor location register 31 provides the communication terminal 60 with a temporary call connection number which is sent to the switching machine 40 through the home location register 20. The switching machine 40 connects the call to the switching machine 42 in response to the temporary call connection number, and the switching machine 42 connects the call to the communication terminal 60.

FIG. 3 shows the PDC system. In this system, the switching machine 41 associated with the visiting area 50 in the communications network 10 is directly connected to the home location register 20 through the common control line. Likewise, the switching machines 42 and 43 associated with the visiting areas 51 and 52 in the communications network 11 are directly connected to the gate location register 21 through the common control lines. In other words, in the PDC system, the visitor location registers 30–32 are obviated which are provided in the GSM system, and the gate location register 21 is provided in the communications network, excluding in the communications network which is provided with the home location register 20. Although the visiting areas have one to one correspondence with the switching machines in this figure, this is not essential.

When the communication terminal 60 is in the communications network 10 including the home location register 20 (that is, in the home communications network), the home location register 20 stores the number of the visiting area in which the communication terminal 60 is present, and the number of the switching machine the communication terminal 60 used last, in addition to the number and information about the communication terminal 60.

On the other hand, when the communication terminal 60 is in the communications network 11 other than the home communications network (that is, in the visiting communications network), the home location register 20 stores the number of communications network indicating the communications network 11 in which the communication terminal 60 is present, and the information about the communication terminal 60. The gate location register 21 in the communications network 11 stores the information about the communication terminal 60, the number of visiting area in which the communication terminal 60 is present, and the number of switching machine the communication terminal 60 used last. In addition, the gate location register 21 stores the communication terminal numbers of individual subscriber terminals, communication terminal information, the numbers of the switching machines and the visiting area numbers in the communications network 11.

When the communication terminal 60 moves from a visiting area not shown in FIG. 3 to the visiting area 50, or moves in the visiting area 50, and sends a location registration signal to the switching machine 41, the location of the communication terminal 60 (the visiting area number) is stored in the home location register 20.

FIG. 4A illustrates the procedure of a first location registration when the communication terminal 60 moves from the visiting area 50 in the communications network 10 to the visiting area 51 in the communications network 11.

When the communication terminal 60 enters the visiting area 51 and sends the location registration signal to the switching machine 42, the switching machine 42 carries out the location registration of the communication terminal 60 to the home location register 20 through the gate location register 21. More specifically, when the switching machine 42 sends to the gate location register 21 the communication terminal number, switching machine number and visiting area number of the communication terminal 60, the gate location register 21 in turn sends to the home location register 20 the number of the communication terminal 60, the number of the communications network 11 and the call connection number used for a call connection from the communications network 10 to the communications network 11. After storing these data, the home location register 20 sends the location registration signal back to the gate location register 21, and then the gate location register 21 sends a location registration response signal back to the communication terminal 60 via the switching machine 42, thereby completing the location registration.

FIG. 4B illustrates the procedure of a location registration processing when the communication terminal 60 moves within the same communications network 11, that is, when the communication terminal 60 moves within the visiting area 52 in the communications network 11, or moves from the visiting area 51 to the visiting area 52.

When the communication terminal 60, which is present in the visiting area 52, sends the location registration signal to the switching machine 43, the switching machine 43 sends to the gate location register 21 the communication terminal number, switching machine number and visiting area number associated with the communication terminal 60. Having stored these data, the gate location register 21 sends back the location registration response signal to the communication terminal 60 via the switching machine 43, thereby completing the location registration. In this case, the home location register 20 is not updated.

FIG. 5 illustrates the processing procedure of a call connection occurred while the communication terminal 60 is in the visiting area 52. The call to the communication terminal 60 is first connected to the switching machine 41 linked to the home location register 20. The switching machine 41 inquires of the home location register 20 the communication terminal location. The home location register 20 sends back a call connection number indicating the location of the communication terminal 60. The switching machine 41 connects the call to the switching machine 42 by using this call connection number. The switching machine 42 inquires of the gate location register 21 the information about the communication terminal, reads the location of the communication terminal 60, and connects the call to the switching machine 43. The switching machine 43 connects the call to the communication terminal 60 in the visiting area 52.

When the communication terminal 60 is in the communications network 10, the location of the communication terminal 60 is stored in the home location register 20. In this case, the switching machine 41 connects the call to a switching machine covering the location. Then, the switching machine connects the call to the communication terminal 60 in the visiting area the switching machine covers.

The foregoing GSM as shown in FIGS. 1, 2A and 2B has the following drawbacks.

(1) When the communication terminal 60 moves to another visiting area even in the same communications network, the home location register 20 must be updated as illustrated in FIG. 2A. Therefore, when the communication terminal 60 moves to another visiting area in the communications network other than the home communications network, as moving from the visiting area 51 to visiting area 52, it becomes necessary to update the home location register 20 in other communications network. This will increase the traffic on the common control line between the communications networks.

(2) When increasing a new visitor location register in a communications network, it is required for the new visitor location register to be accessed from the other communications networks.

On the other hand, the PDC system as shown in FIGS. 3–5 is provided with a home location register or a gate location register (these are called location registers in common) for each communications network to store the information about each communication terminal. Therefore, it is not necessary to update the information of the home location register in other communications network when the communication terminal moves within the same communications network, in which case only the location register in that communications network is updated. This will reduce the traffic between the communications networks.

It is necessary, however, for such an arrangement to send the communication terminal information from the location register to the switching machine at a calling or a call connection. This will increase the traffic on the common control lines in the same communications network, thereby causing delay of the calling and call connection. In particular, the drawback cannot be ignored when the switching machine is located far from the location register.

DISCLOSURE OF THE INVENTION

The object of the present invention is to provide a mobile communications system and communications network that can reduce the traffic within and between the communications networks.

In a first aspect of the present invention, there is provided a mobile communications system including a plurality of communications networks, and a communication terminal which moves in and between one or more visiting areas in the communications networks, and carries out a location registration in a current visiting area, the mobile communications system comprising:

a location register located in each of the communications networks for storing information about the communication terminal and a visiting area in which the communication terminal is present, when the communication terminal enters the communications network in which the location register is located from another communications network, and carries out the location registration; and a visitor register located in each of the visiting area for receiving information about the communication terminal sent from the location register in the communications network, and for storing the information about the communication terminal, when the communication terminal moves to the visiting area in which the visitor register is located from another visiting area in the same communications network.

Here, the location register may be a home location register located in a home communications network, in which the communication terminal is registered in advance, for storing the information about the communication terminal.

The location register may be a gate location register located in a visitor communications network different from the home communications network, for receiving the information about the communication terminal from the home location register and for storing the information, when the communication terminal moves from the home communications network to the visitor communications network.

In a second aspect of the present invention, there is provided a mobile communications network including one or more visiting areas, wherein a communication terminal moves in and between the visiting areas, and carries out a location registration in a current visiting area, the mobile communications network comprising:

a location register for storing information about the communication terminal and a visiting area in which the communication terminal is present, when the communication terminal carries out the location registration; and a visitor register located in each of the visiting areas for receiving the information about the communication terminal sent from the location register and for storing the information, when the communication terminal moves in from another visiting area.

The mobile communications network may be a home communications network in which the communication terminal is registered in advance, and the location register is a home location register for continually storing the information about the communication terminal.

The mobile communications network may be a visitor communications network different from a home communications network in which the communication terminal is registered in advance, and the location register may be a gate location register for receiving the information about the communication terminal from the location register of the home communications network and for storing the information, when the communication terminal moves from the home communications network to the visitor communications network.

The visitor register may further comprise:

a first timer means for counting a time period after having been reset when a call connection occurs to the communication terminal; and means for registering in the location register a number of the visitor register of the visiting area in which the communication terminal is present, when the communication terminal carries out a location registration after the first timer has counted a predetermined first time period.

The visitor register may further comprise:

a second timer means for counting a time period after having been reset when communications occurs between the communication terminal and the visitor register; and means for deregistering the information about the communication terminal stored in the visitor register, when the second timer means has counted a predetermined second time period.

According to the present invention, it is possible to reduce the traffic on the common control lines between the home communications network in which the home location register is located and the communications networks (visiting communications networks) other than the home communications network. It is also possible to reduce the traffic on the common control lines between the visitor registers and the location register in the same communications network.

Furthermore, using the first timer information makes it possible to correct the inconsistency of information between the visitor registers and the location register. Moreover, using the second timer information makes it possible to automatically delete from the visitor register the information about the communication terminal which is absent in that visiting area.

These will be described in more detail in the following embodiment.

BRIEF DESCRIPTION OF THE DRAWINGS

FIG. 2A is a diagram illustrating the procedure of a location registration processing in the GSM system;

FIG. 2B is a diagram illustrating the procedure of a call connection processing in the GSM system;

FIGS. 4A and 4B are diagrams illustrating procedures of location registration processings in the PDC system;

BEST MODE FOR CARRYING OUT THE INVENTION

An embodiment in accordance with the present invention will now be described with reference to the accompanying drawings.

Figure 6:
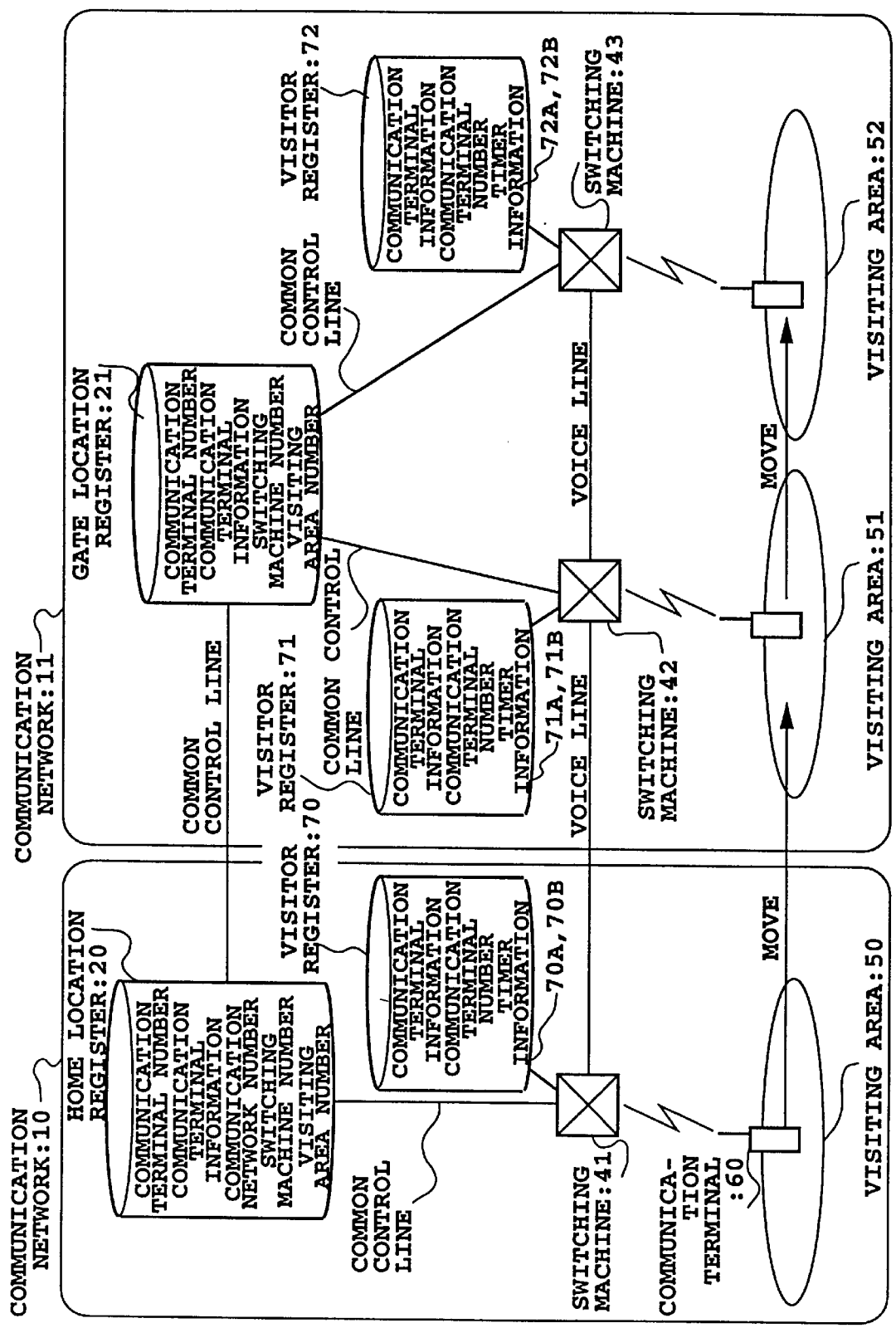
FIG. 6 is a block diagram showing a configuration of an embodiment of a mobile communications system in accordance with the present invention.

FIG. 6 is a block diagram showing a configuration of an embodiment of a mobile communications system in accordance with the present invention. This embodiment mainly differs from the conventional PDC system in the following:

(1) The switching machines 41–43 are provided with visitor registers 70–72, respectively. Specifically, the visitor register 70 is added to the switching machine 41 for storing the communication terminal information and communication terminal numbers. Likewise, the visitor register 71 is added to the switching machine 42, and the visitor register 72 is added to the switching machine 43.

Figure 1:
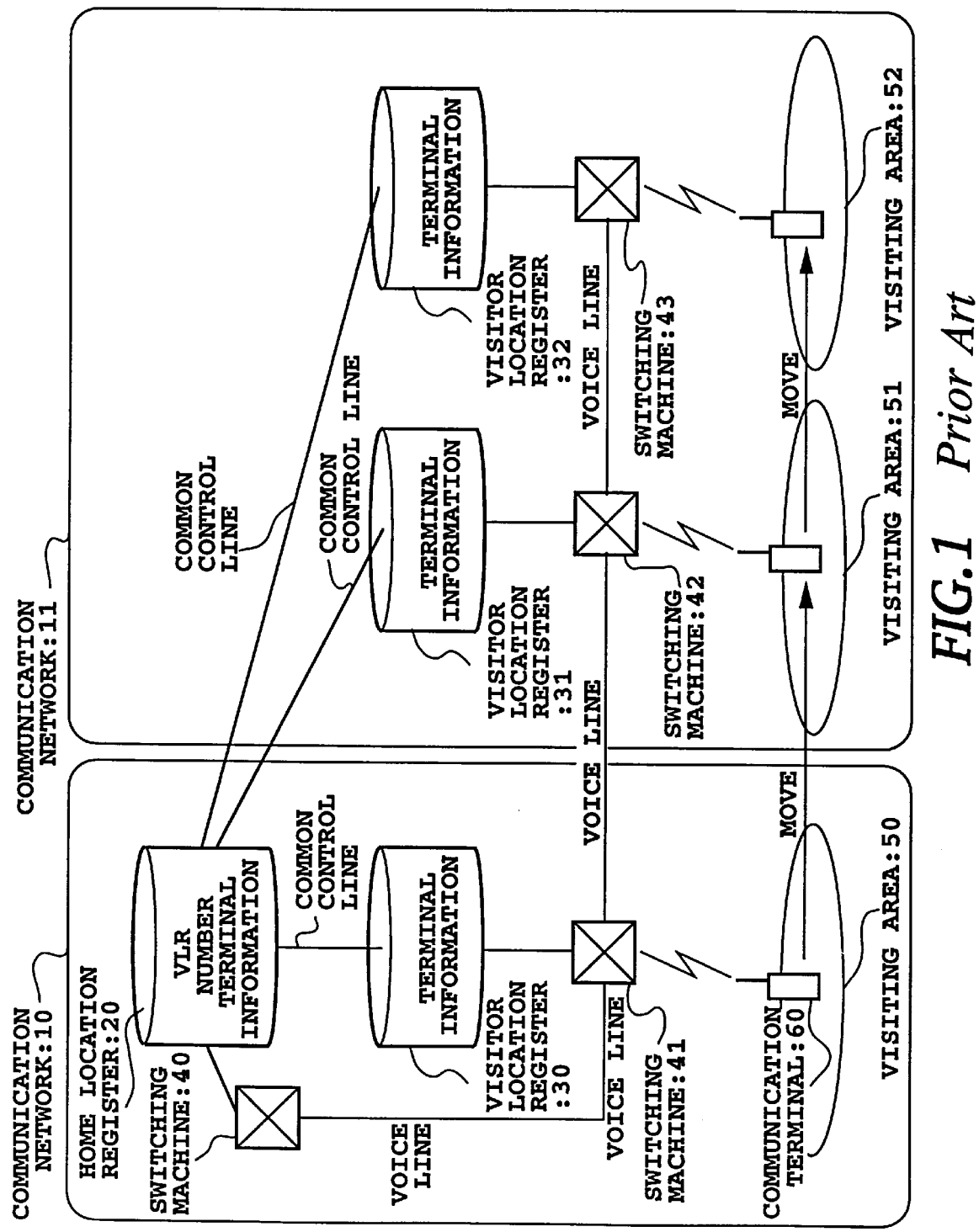
FIG. 1 is a block diagram showing a configuration of a conventional GSM system.

The visitor registers 70–72 have a configuration simpler than that of the visitor location registers 30–32 of the GSM system as shown in FIG. 1. It is necessary for the visitor location registers 30–32 of the GSM system to preserve the integrity of the stored data. In other words, they must be provided with measures to backup by restart or the like against potential loss of data, or to reconstruct data between the home location register and the visitor location registers. In contrast with this, it is sufficient for the visitor registers 70–72 of this embodiment to store plain copies of the data in the location registers, and to make copies of the data from the location registers again if the data is lost.

(2) The visitor register 70 includes a plurality of pairs of timer information 70A and 70B, each of which is provided in connection with each communication terminal present in the visiting area. Similar timer information 71A and 71B is provided in the visitor register 71, and timer information 72A and 72B is provided in the visitor register 72. The timer information is used for handling mismatches of data between the location registers and visitor registers.

In FIG. 6, the home location register 20 stores the information about the communication terminal 60 which subscribes to the communications network 10. In addition, when the communication terminal 60 is present in the visiting area 50 in the communications network 10, the home location register 20 stores the number of the visiting area 50 and the number of the switching machine 41 thereof. When the communication terminal 60 is present in the visiting area in the communications network 11, the home location register 20 stores the number of the communications network 11 and a call connection number used for connecting a call from the communications network 10 to the communications network 11.

The gate location register 21 stores the information about the communication terminal 60 in the communications network 11, the number of the visiting area in which the communication terminal 60 is present, and the number of the switching machine of the visiting area.

Figure 7:
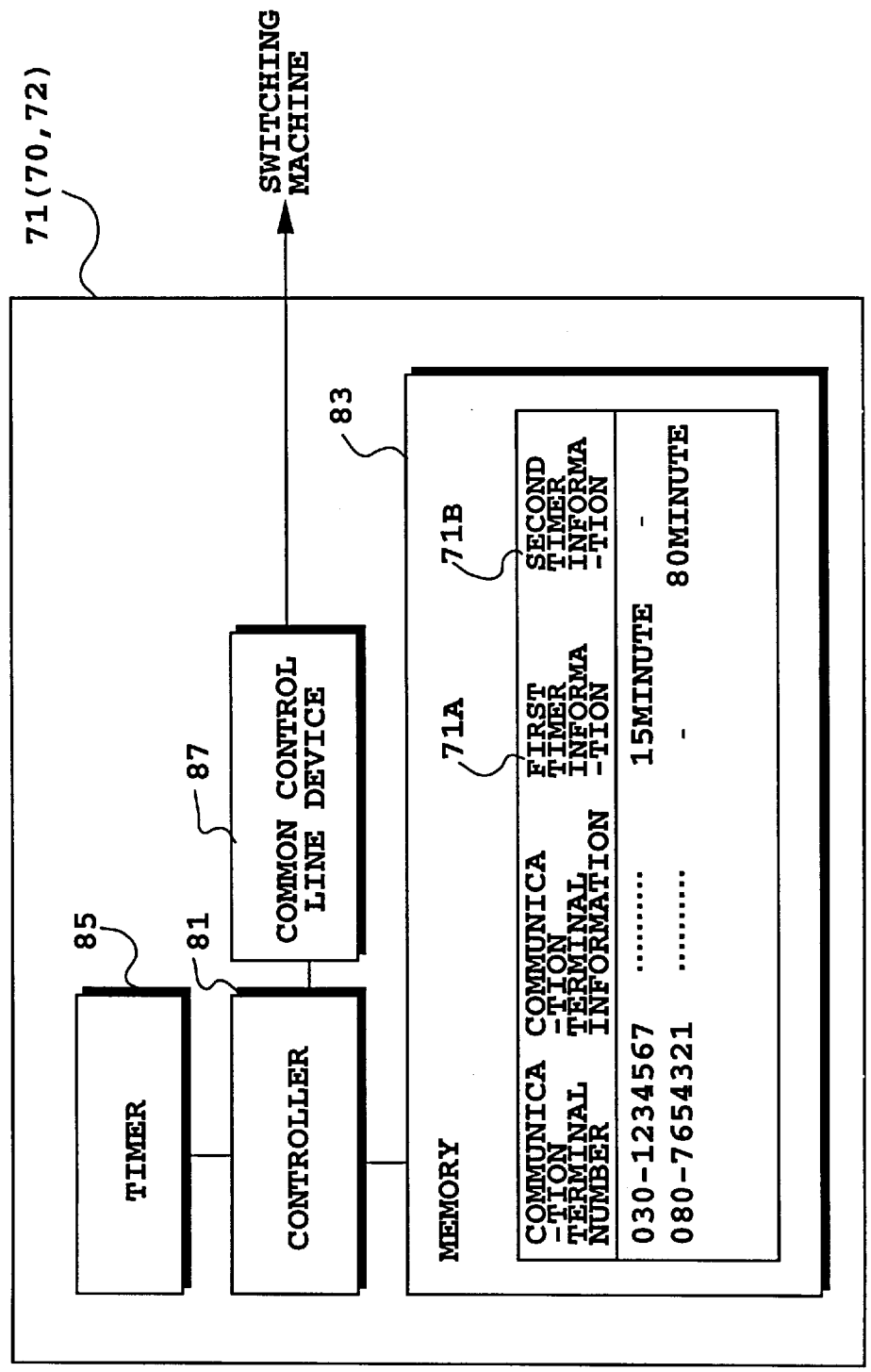
FIG. 7 is a block diagram showing a configuration of a visitor register of the embodiment.

FIG. 7 is a block diagram showing a configuration of the visitor register 71 (70, 72). The visitor register is usually arranged with a computer like a workstation. The visitor register 71 comprises a controller 81, a memory 83, a timer 85 and a common control line device 87. The common control line device 87 is connected to the switching machine through the common control line.

The memory 83 stores for each number of the communication terminals in the visiting area, the communication terminal information, the first timer information 71A and the second timer information 71B. The controller 81 updates timer information in response to the information fed from the timer 85.

The first timer information 71A is provided as a measure against a potential error of the information about the communication terminal 60, which is stored in the gate location register 21. The visitor register 71 decides that the information about the communication terminal 60, which is stored in the gate location register 21, is erroneous if a call connection to the communication terminal 60 does not occur for more than a fixed time $T_1$. In this case, the visitor register 71, receiving a location registration request from the communication terminal 60, commands the gate location register 21 to rewrite the information therein in accordance with the contents of the visitor register 71. The first timer information is used for counting the fixed time $T_1$.

The second timer information 71B, on the other hand, is provided for deleting the information about the communication terminal 60 remaining in the visitor register 71 even after the communication terminal 60 has moved from the visiting area 51 to another visiting area. Specifically, if there occurs no location registration signal or calling from the communication terminal 60, or no call connection to the communication terminal 60 for more than a fixed time $T_2$, the visitor register 71 decides that the communication terminal 60 has left the visitor register, and deletes the information about the communication terminal 60. The second timer information 71B is used to count this fixed time $T_2$. The second timer information 71B is reset when the first timer information 71A expires, when a call connection to the communication terminal occurs, or when the location registration request or calling from a communication terminal occurs, and after the reset, it is updated by the information from the timer 85.

Figure 8A:
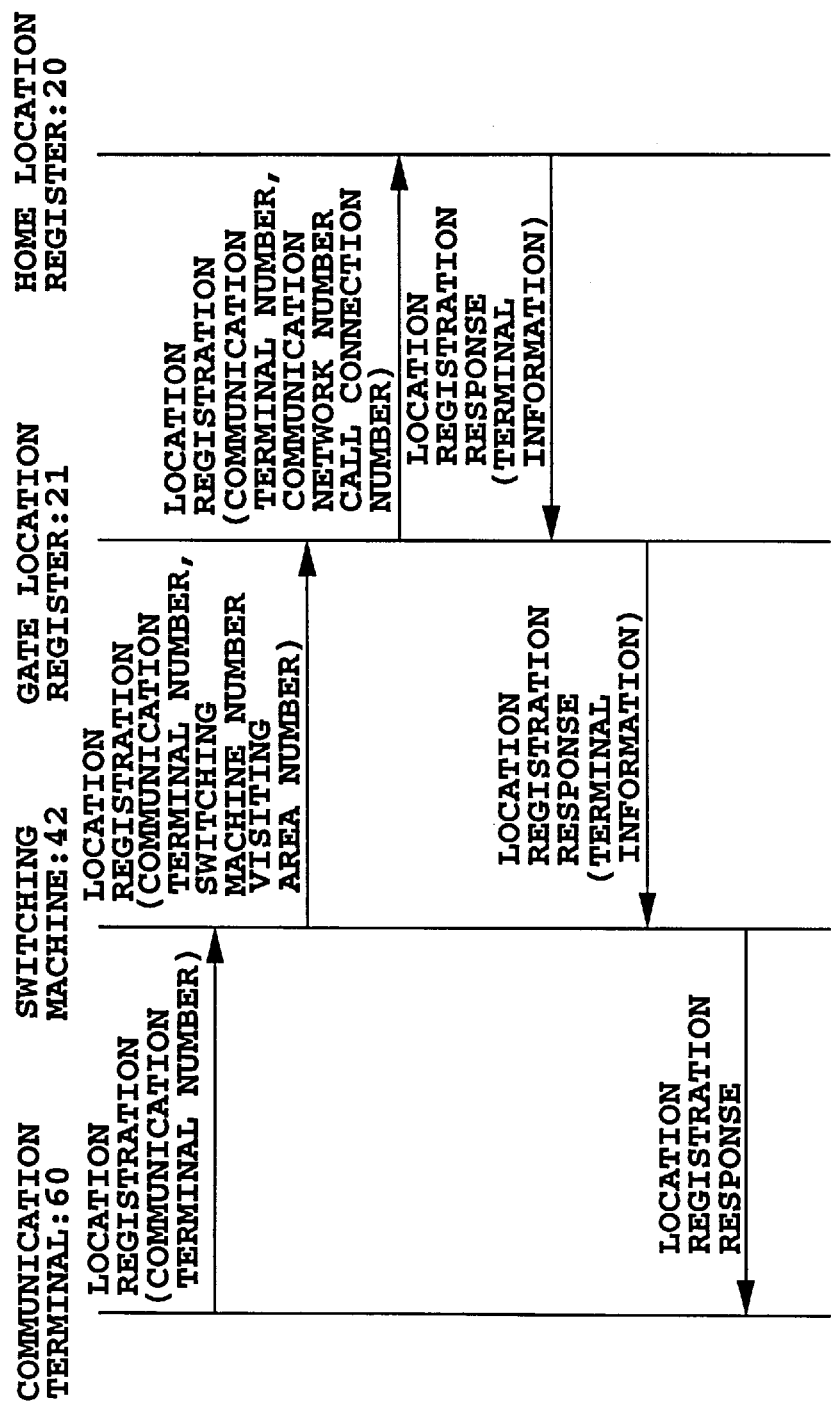
FIGS. 8A–8C are diagrams illustrating procedures of location registration processings in the system of the embodiment.

FIG. 8A illustrates a first location registration procedure when the communication terminal 60 moves from the communications network 10 to the communications network 11.

When the communication terminal 60 moves from the visiting area 50 in the communications network 10 to the visiting area 51 in the communications network 11, and sends the location registration signal to the switching machine 42, the switching machine 42 accesses to the visitor register 71. If the information about the communication terminal 60 is not stored in the visitor register 71, the switching machine 42 sends the gate location register 21 a location registration signal including the number of the communication terminal 60, the number of the switching machine 42, and the number of the visiting area 51. The gate location register 21, receiving the location registration signal, sends the home location register 20 the location registration signal including the number of the communication terminal 60, the number of the communications network 11 and the call connection number only when the gate location register 21 does not store the number of the communication terminal 60.

The home location register 20, receiving the location registration signal, stores the number of the communications network 11 and the call connection number, and sends back to the gate location register 21 a location registration response including the information about the communication terminal 60. The gate location register 21, receiving the location registration response, stores the number of the communication terminal 60, the number of the visiting area 51 of the communication terminal 60, the number of the switching machine 42 of the visiting area 51 and the information about the communication terminal 60, and sends back to the switching machine 42 the location registration response including the information about the communication terminal 60. The switching machine 42, receiving the location registration response, registers the communication terminal number and information about the communication terminal 60 in the memory 83 in the visitor register 71.

Figure 8B:
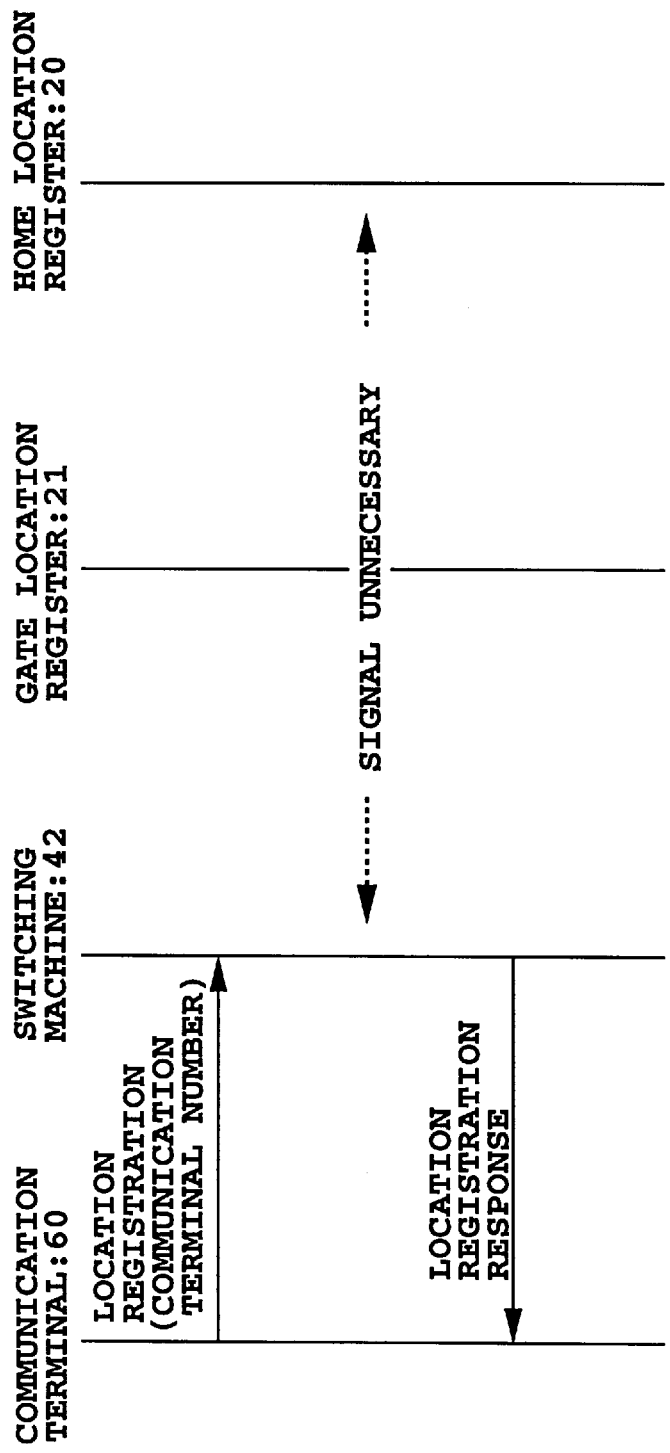

FIG. 8B illustrates a procedure when the communication terminal 60, moving in the visiting area 51, carries out a second and the following location registrations. The switching machine 42 receives the location registration signal from the communication terminal 60, and accesses the visitor register 71. This time, at which the first location registration has been completed, since the memory 83 of the visitor register 71 stores the information about the communication terminal 60, the switching machine 42 immediately sends back the location registration response to the communication terminal 60.

In this case, if the memory 83 of the visitor register 71 stores the number of the communication terminal 60, and the first timer information 71A of the communication terminal 60 has not yet expired, it is unnecessary to update the contents of the gate location register 21 associated with the communication terminal 60. This is because the information about the communication terminal 60 stored in the gate location register 21 is estimated to be correct if the first timer information 71A has not yet expired. On the contrary, if the first timer information 71A has expired which is associated with the communication terminal 60 and stored in the visitor register 71, the following processing is carried out as shown in FIG. 8C.

Figure 8C:
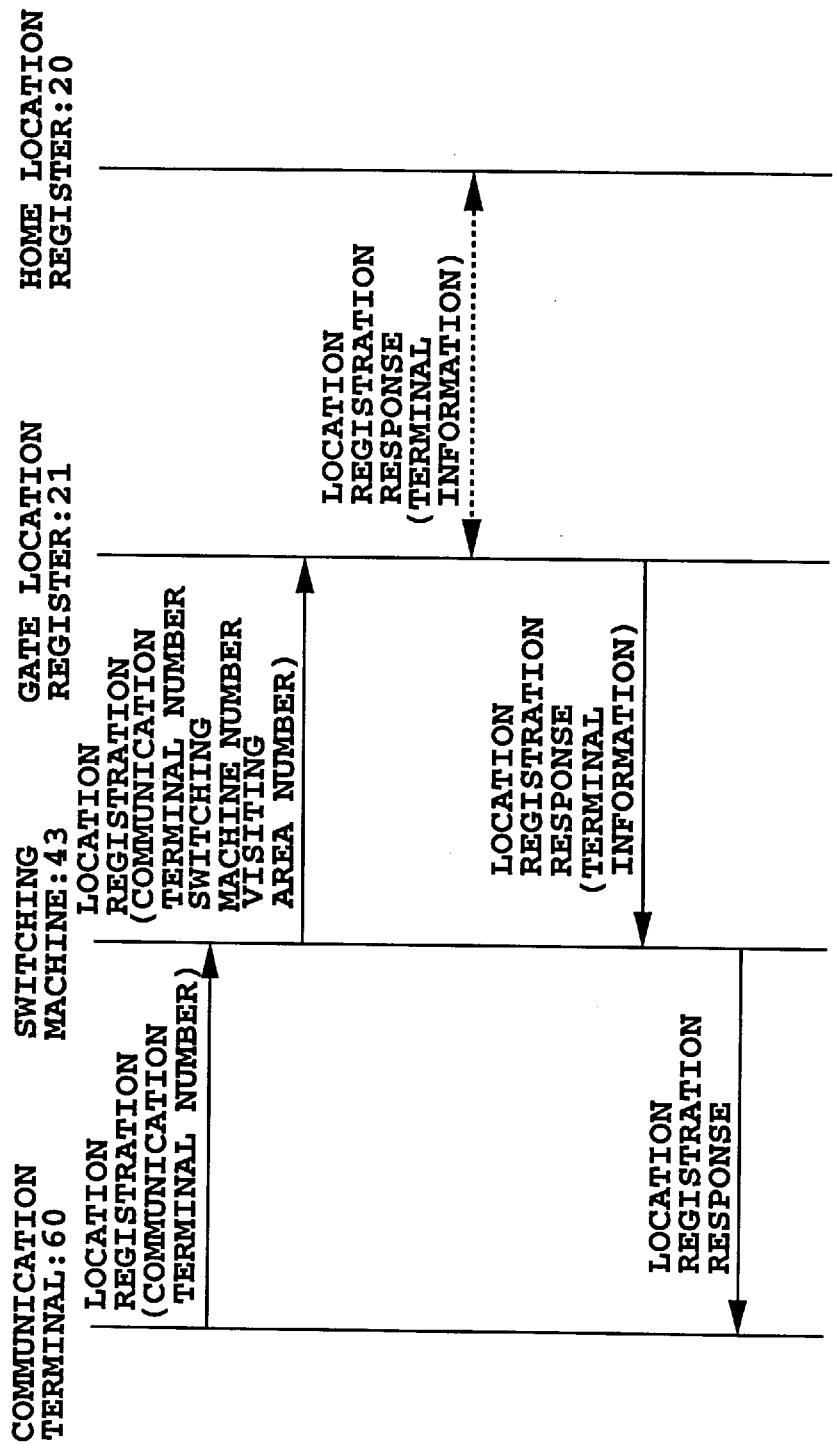

FIG. 8C illustrates the procedure of the location registration when the communication terminal 60 moves between the visiting areas in the communications network 11, or when the first timer information has expired.

When the communication terminal 60 moves from the visiting area 51 to the visiting area 52 in the communications network 11, and the switching machine 43 receives the location registration signal, the switching machine 43 accesses the visitor register 72. If the memory 83 of the visitor register 72 does not store the number of the communication terminal 60, the switching machine 43 sends the gate location register 21 the location registration signal including the number of the communication terminal 60, the number of the switching machine 43 and the number of the visiting area 52. The gate location register 21, when storing the number of the communication terminal 60 and receiving the location registration signal, sends a communication terminal information deregistration signal to the visitor register 71 in the visiting area 51 in which the communication terminal 60 was previously present. The gate location register 21 also stores the number of the switching machine 43 and the number of the visiting area 52, and sends back to the switching machine 43 the location registration response including the information about the communication terminal 60.

The visitor register 71, receiving the communication terminal information deregistration signal, deletes the communication terminal number and information about the communication terminal 60 which are stored in the visitor register 71. On the other hand, the switching machine 43 which receives the location registration response, writes the number and information about the communication terminal 60, and sends the location registration response back to the communication terminal 60. In this case, it is unnecessary to rewrite the contents of the home location register 20.

Similar processing is carried out when the location registration occurs after the first timer information has expired. More specifically, the switching machine 43 decides that the information about the communication terminal 60, stored in the gate location register 21 is incorrect. Then the switching machine 43 sends the gate location register 21 the location registration signal, and resets the first timer information 72A. The location registration signal includes the number of the communication terminal 60, the number of the switching machine 43 and the number of the visiting area 52. The gate location register 21 updates the information about the communication terminal 60 using the location registration signal. Thus, the correct information about the communication terminal 60 is stored in the gate location register 21.

Figure 9:
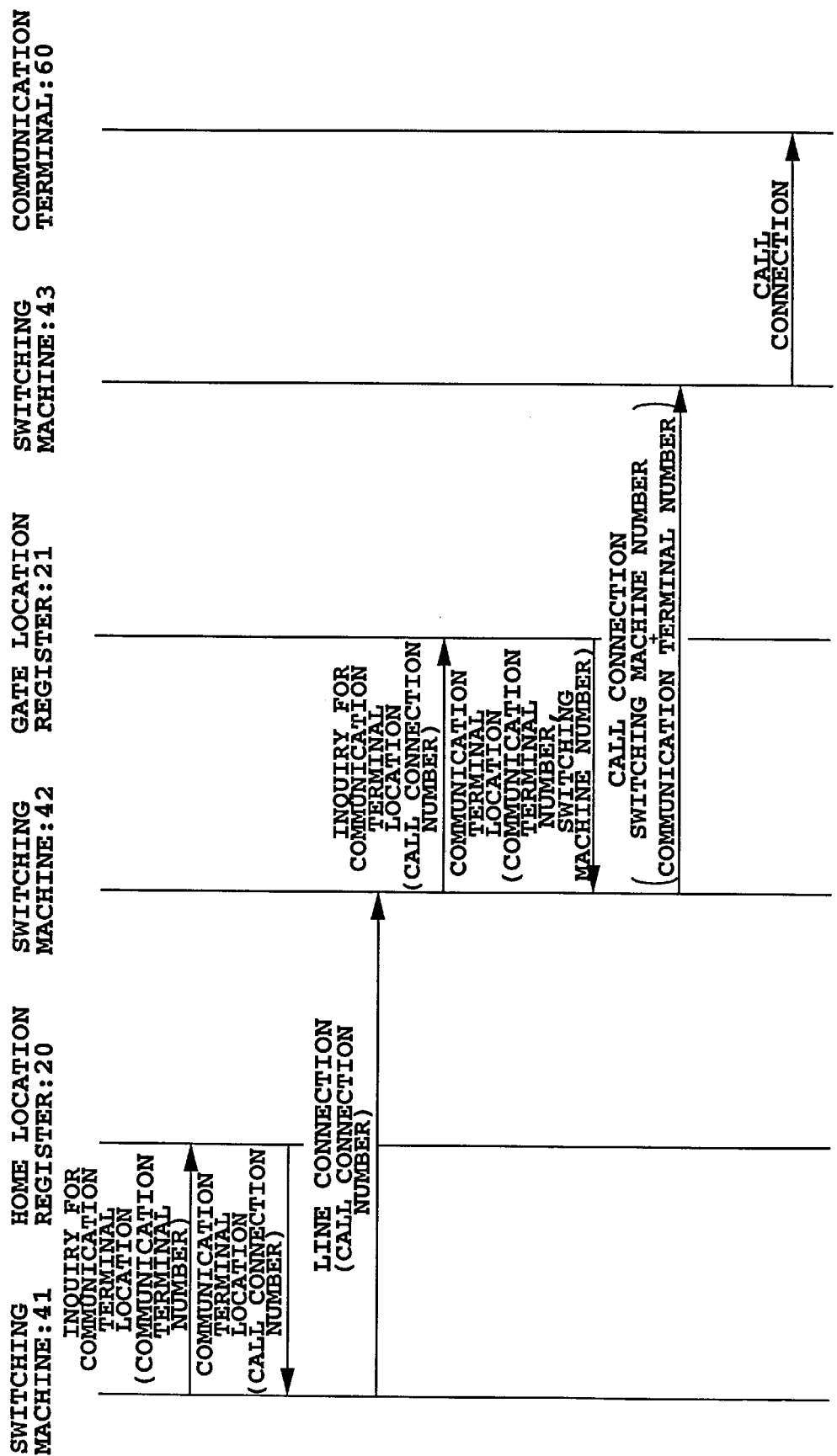
FIG. 9 is a diagram illustrating the procedure of a call connection processing in the embodiment.

FIG. 9 illustrates a procedure of a call connection processing to the communication terminal 60 in the visiting area 52. A call to the communication terminal 60 is first connected to the switching machine 41 in the communications network 10 in which the home location register 20 is provided. The switching machine 41 inquires of the home location register 20 the location of the communication terminal. The home location register 20 sends the communication terminal location back to the switching machine 41 in the form of a call connection number. The switching machine 41 extends the line to the switching machine 42 in the communications network 11 by using the call connection number.

The switching machine 42 inquires of the gate location register 21 the communication terminal location using the call connection number. The gate location register 21 sends back to the switching machine 42 the number of the communication terminal 60 and the number of the switching machine 43 of the visiting area 52 in which the communication terminal 60 is present. The switching machine 42 extends the line to the switching machine 43 using the number of the switching machine 43 which has been received. The switching machine 43 accesses the visitor register 72.

If the visitor register 72 stores the information about the communication terminal 60, the switching machine 43 connects the line to the communication terminal 60. In this case, if the first timer information 72A has expired, and the second timer information 72B is acting, the first timer information 72A and the second timer information 72B are reset. This is because the correct connection of the call proves that the information about the communication terminal 60 which is stored in the gate location register 21 is correct, and that the communication terminal 60 is present in the visiting area 52.

On the other hand, if the information about the communication terminal 60 is not stored in the visitor register 72, the switching machine 43 reads the information about the communication terminal 60 from the gate location register 21, and registers the communication terminal information and communication terminal number to the visitor register 72, followed by the connection of the communication terminal 60 to the line. When the connection to the communication terminal 60 has been completed, the switching machine 43 resets the first timer information 72A and the second timer information 72B of the visitor register 72. This is because, in this case also, the correct connection of the call proves that the information about the communication terminal 60 which is stored in the gate location register 21 is correct, and that the communication terminal 60 is present in the visiting area 52.

According to the present invention, the following advantages can be gained:

(1) First, let us compare the present invention with the GSM system as shown in FIGS. 1, 2A and 2B. In the GSM system, when the communication terminal 60 moves from the visiting area 51 to the visiting area 52 in the communications network 11, the visitor location registers 32 and 31 operates in the same manner as the visitor location registers 31 and 30 of FIG. 2A. Thus, the visitor location register 32 must communicate with the home location register 20 to obtain the communication terminal information.

In contrast, according to the present invention, when the communication terminal 60 moves from the visiting area 51 to the visiting area 52, the switching machine 43 can obtain the communication terminal information from the gate location register 21 in the same communications network 11 as shown in FIG. 8C. This can obviate the communications with the home location register 20 in the communications network 10. Thus, the present invention can reduce the traffic on the common control line between the communications networks 10 and 11. This is particularly effective in such a case as the communications network 10 is located in Europe and the communications network 11 is located in Japan.

Figure 3:
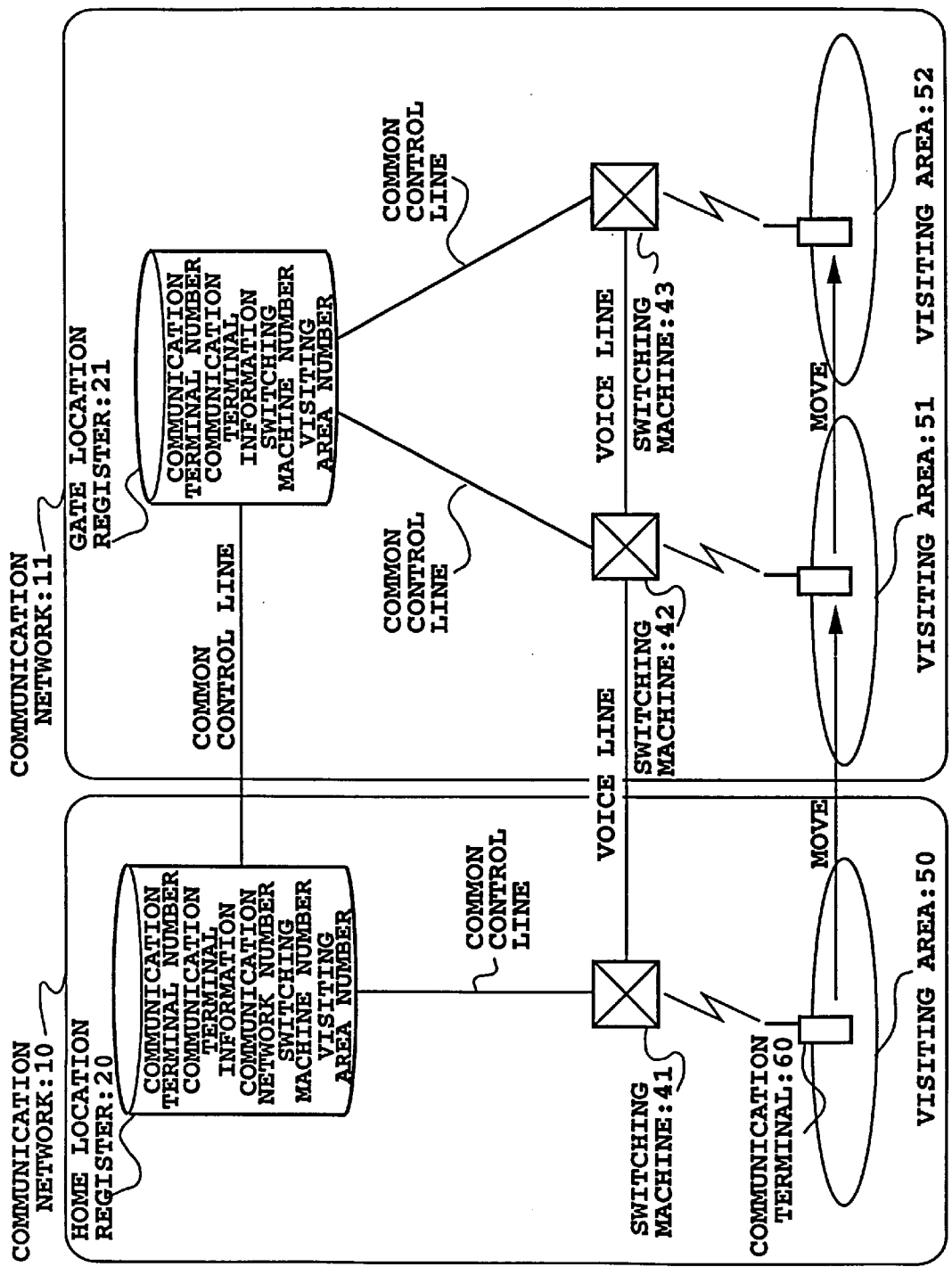
FIG. 3 is a block diagram showing a configuration of a conventional PDC system.
Figure 4A:
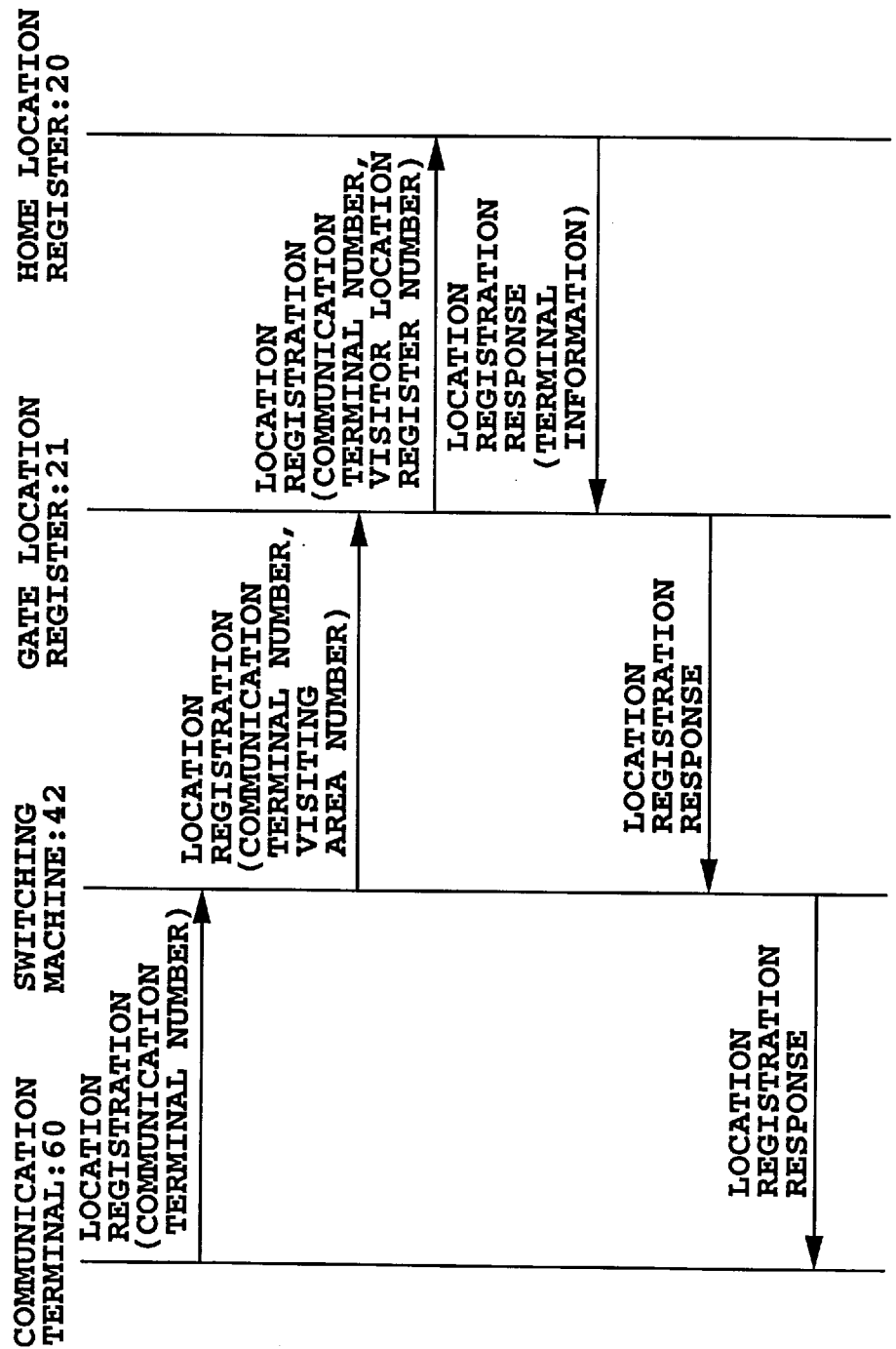
Figure 5:
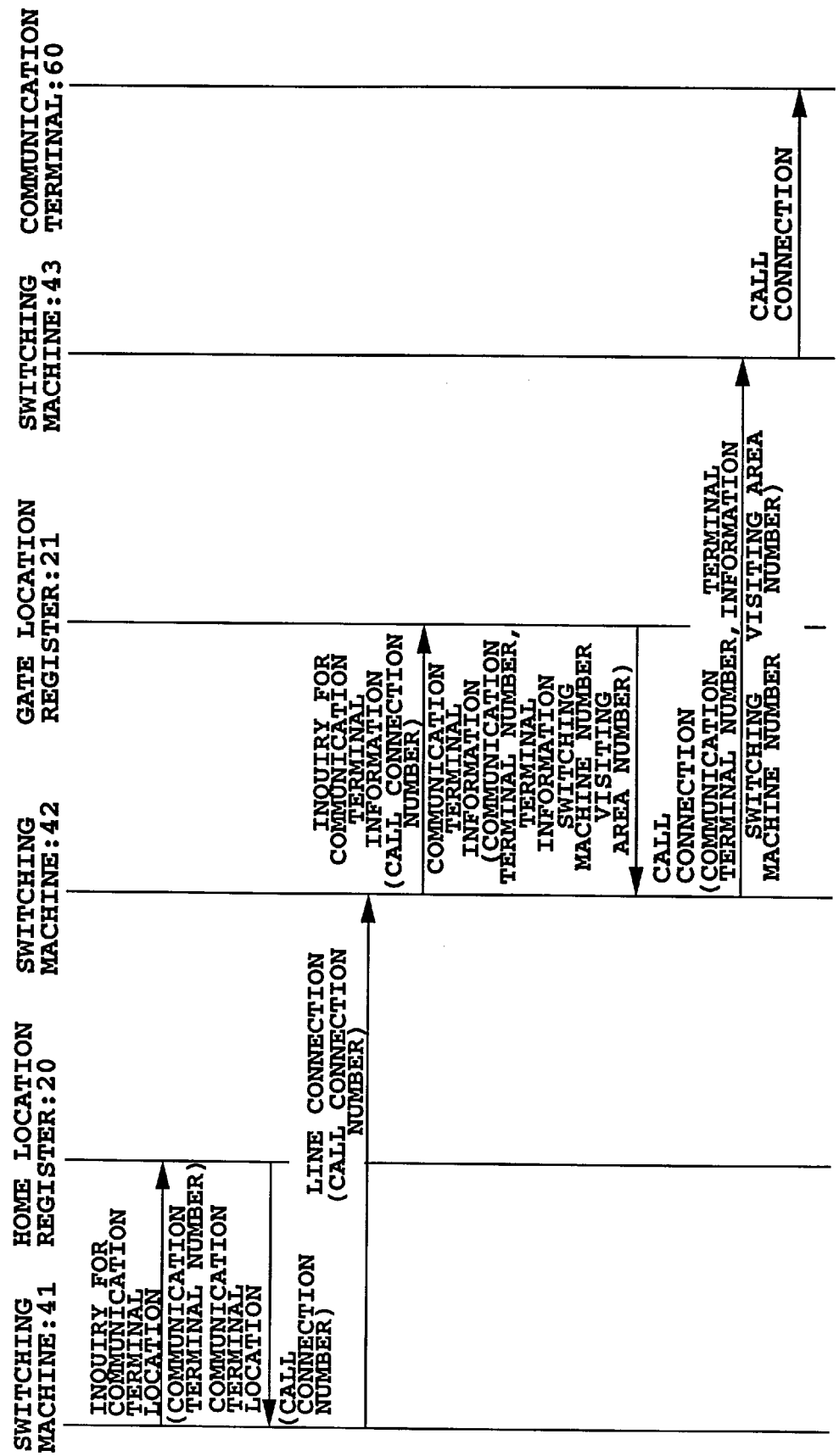
FIG. 5 is a diagram illustrating the procedure of a call connection processing in the PDC system.

(2) Next, let us compare the present invention with the PDC system as shown in FIGS. 3–5. When the communication terminal 60 moves in the visiting area 51 in the communications network 11 in the PDC system, the switching machine 42 operates in the manner as shown FIG. 4A. This means that the switching machine 42 must communicate with the gate location register 21 to obtain the communication terminal information.

In contrast, according to the present invention, when the communication terminal 60 moves within the visiting area 51, it is enough for the switching machine 42 only to access the visitor register 71 connected thereto as shown in FIG. 8B. Thus, the present invention can reduce the traffic on the common control line between the switching machine and the gate location register 21. This is particularly effective when the switching machine is located far from the gate location register 21.

(3) The present invention can correct the inconsistency that could occur between the information in the visitor register about the communication terminal, and that in the gate location register 21. Specifically, the inconsistency can be corrected (a) if there is no communication terminal information in the visitor register designated by the gate location register, or (b) when the gate location register 21 does not designate the visitor register which includes the communication terminal information.

In case of (a), the visitor register reads the communication terminal information from the gate location register 21 at the occurrence of a call connection to the communication terminal 60, and stores it.

In case of (b), the correction is carried out using the first timer information. The first timer information is reset by the occurrence of a call connection to the communication terminal 60. If the visitor register receives the location registration signal from the communication terminal 60 in such a state that no call connection has occurred to the communication terminal 60 before its first timer information has expired, the visitor register registers its number in the gate location register 21. This is because the visitor register decides that the gate location register 21 is in the state of (b), if there occurs no call connection to the communication terminal for more than the fixed time $T_1$.

Thus, the inconsistency of information between the visitor register and the gate location register can be corrected.

(4) According to the present invention, the information about a communication terminal which is absent in a visiting area can be automatically deregistered. The second timer information is used for this purpose. More specifically, the visitor register decides that the communication terminal 60 is not present in the visiting area when there is no communication for more than the fixed time $T_2$ therebetween, and automatically deregisters the information about the communication terminal 60.

What is claimed is:

1. A mobile communications system including a plurality of communications networks, and a communication terminal which moves in and between one or more visiting areas in said communications networks, and carries out a location registration in a current visiting area, said mobile communications system comprising:

a location register located in each of said communications networks for storing information about said communication terminal and a visiting area in which said communication terminal is present, when said communication terminal enters the communications network in which said location register is located from another communications network, and carries out said location registration; and a visitor register located in each of said visiting areas for receiving information about said communication terminal sent from said location register in said communications network, and for storing said information about said communication terminal, when said communication terminal moves to the visiting area in which said visitor register is located from another visiting area in the same communications network, wherein said visitor register further comprises:

first timer means for counting a time period after having been reset when a call connection occurs to said communication terminal; and means for registering in said location register a number of said visitor register of said visiting area in which said communication terminal is present, when said communication terminal carries out a location registration after said first timer has counted a predetermined first time period.

2. The mobile communications system as claimed in claim 1, wherein said visitor register further comprises:

a second timer means for counting a time period after having been reset when communications occurs between said communication terminal and said visitor register; and means for deregistering said information about said communication terminal stored in said visitor register, when said second timer means has counted a predetermined second time period.

3. A mobile communications system including a plurality of communications networks, and a communication terminal which moves in and between one or more visiting areas in said communications networks, and carries out a location registration in a current visiting area, said mobile communications system comprising:

a location register located in each of said communications networks for storing information about said communication terminal and a visiting area in which said communication terminal is present, when said communication terminal enters the communications network in which said location register is located from another communications network, and carries out said location registration; and a visitor register located in each of said visiting areas for receiving information about said communication terminal sent from said location register in said communications network, and for storing said information about said communication terminal, when said communication terminal moves to the visiting area in which said visitor register is located from another visiting area in the same communications network, wherein said location register is a home location register located in a home communications network, in which said communication terminal is registered in advance, for storing said information about said communication terminal, and wherein said location register is a gate location register located in a visitor communications network different from said home communications network, for receiving said information about said communication terminal from said home location register and for storing said information, when said communication terminal moves from said home communications network to said visitor communications network, wherein said visitor register further comprises:

a first timer means for counting a time period after having been reset when a call connection occurs to said communication terminal; and means for registering in said location register a number of said visitor register of said visiting area in which said communication terminal is present, when said communication terminal carries out a location registration after said first timer has counted a predetermined first time period.

4. The mobile communications system as claimed in claim 3, wherein said visitor register further comprises:

a second timer means for counting a time period after having been reset when communications occurs between said communication terminal and said visitor register; and means for deregistering said information about said communication terminal stored in said visitor register, when said second timer means has counted a predetermined second time period.

5. A mobile communications network including one or more visiting areas, wherein a communication terminal moves in and between said visiting areas, and carries out a location registration in a current visiting area, said mobile communications network comprising:

a location register for storing information about said communication terminal and a visiting area in which said communication terminal is present, when said communication terminal carries out said location registration; and a visitor register located in each of said visiting areas for receiving said information about said communication terminal sent from said location register and for storing said information, when said communication terminal moves in from another visiting area, wherein said visitor register further comprises:

a first timer means for counting a time period after having been reset when a call connection occurs to said communication terminal; and means for registering in said location register a number of said visitor register of said visiting area in which said communication terminal is present, when said communication terminal carries out a location registration after said first timer has counted a predetermined first time period.

6. The mobile communications network as claimed in claim 5, wherein said visitor register further comprises:

a second timer means for counting a time period after having been reset when communications occurs between said communication terminal and said visitor register; and means for deregistering said information about said communication terminal stored in said visitor register, when said second timer means has counted a predetermined second time period.

7. A mobile communications network including one or more visiting areas, wherein a communication terminal moves in and between said visiting areas, and carries out a location registration in a current visiting area, said mobile communications network comprising:

a location register for storing information about said communication terminal and a visiting area in which said communication terminal is present, when said communication terminal carries out said location registration; and a visitor register located in each of said visiting areas for receiving said information about said communication terminal sent from said location register and for storing said information, when said communication terminal moves in from another visiting area, wherein said mobile communications network is a visitor communications network different from a home communications network in which said communication terminal is registered in advance, and said location register is a gate location register for receiving said information about said communication terminal from the location register of said home communications network and for storing said information, when said communication terminal moves from said home communications network to said visitor communications network, in wherein said visitor register further comprises:

a first timer means for counting a time period after having been reset when a call connection occurs to said communication terminal; and means for registering in said location register a number of said visitor register of said visiting area in which said communication terminal is present, when said communication terminal carries out a location registration after said first timer has counted a predetermined first time period.

8. The mobile communications network as claimed in claim 7, wherein said visitor register further comprises:

a second timer means for counting a time period after having been reset when communications occurs between said communication terminal and said visitor register; and means for deregistering said information about said communication terminal stored in said visitor register, when said second timer means has counted a predetermined second time period.

\* \* \* \* \*